United States Patent [19]

Rauch

[11] 4,400,941
[45] Aug. 30, 1983

[54] VIBRATION ABSORBER FOR A FREE PISTON STIRLING ENGINE

[75] Inventor: Jeffrey S. Rauch, Schenectady, N.Y.

[73] Assignee: Mechanical Technology Incorporated, Latham, N.Y.

[21] Appl. No.: 270,610

[22] Filed: Jun. 5, 1981

[51] Int. Cl.³ .............................................. F02G 1/04
[52] U.S. Cl. ........................................ 60/520; 60/517
[58] Field of Search ........................ 60/517, 520; 62/6

[56] References Cited

U.S. PATENT DOCUMENTS

| | | | |
|---|---|---|---|
| 4,183,214 | 1/1980 | Beale et al. | 60/520 |
| 4,199,945 | 4/1980 | Finkelstein | 60/520 |
| 4,215,548 | 8/1980 | Beremand | 60/520 |

Primary Examiner—Allen M. Ostrager
Assistant Examiner—Stephen F. Husar
Attorney, Agent, or Firm—Joseph V. Claeys; Arthur N. Trausch, III

[57] ABSTRACT

A free piston Stirling engine has a hermetic vessel containing a displacer piston and a power piston coupled to each other and to the vessel by gas springs. An additional mass is coupled to the vessel by a gas spring which is tuned to the operating frequency of the engine geometrically. The vibration absorber is effective at all engine frequencies because the absorber gas spring follows the engine working gas mean pressure and changes the absorber natural frequency as the engine frequency changes.

10 Claims, 3 Drawing Figures

VIBRATION ABSORBER FOR A FREE PISTON STIRLING ENGINE

BACKGROUND OF THE INVENTION

This invention relates to vibration cancellation in reciprocating machinery, and more particularly to a vibration absorber for a free piston Stirling engine. A free piston Stirling engine is a sealed power unit containing a piston and a displacer within a closed vessel. The piston and displacer reciprocate out-of-phase in the vessel to circulate a working fluid through a closed loop from a compression space, through a cooler, regenerator, and a heater to an expansion space and then back through the same loop cyclically to subject a working fluid to a thermodynamic cycle approximating the theoretical Stirling cycle.

A simple and reliable form of free piston Stirling engine contains a single displacer and a single power piston. This form of engine presents the simplest control problems but is inherently unbalanced. That is, the reciprocating masses transmit an alternating force to the sealed vessel and this force must be absorbed by massive mounting structure or a sophisticated suspension arrangement. One such suspension arrangement is shown in U.S. application Ser. No. 153,839 entitled, "A Suspension and Vibration Oscillation System Incorporated Into the Mass Flow System for a Linear Reciprocating Machine" filed on May 27, 1980, by Peter Curwen, et. al now U.S. Pat. No. 4,360,087. This arrangement is extremely effective and produces a remarkable cancellation of force on the system so that the sinusoidal force exerted by the case is completely cancelled by the suspension system and the connection to the ground experiences an insignificant transmitting force, if any.

Although this system works well, it would be desirable to provide a system more particularly designed for a free piston Stirling engine which automatically compensates for changing frequency and/or stroke of the reciprocating members in the engine. Moreover, certain installations of the free piston Stirling engine may necessitate the elimination of all substantial vibration by the vessel itself.

SUMMARY OF THE INVENTION

Accordingly, it is an object of this invention to provide an automatically compensating vibration absorption system for a free piston Stirling engine which automatically compensates for changing frequency and stroke of the reciprocating members of the engine. It is another object of this invention to provide a vibration absorption system that eliminates all substantial vibration of the engine vessel and whose parts are sealed within the vessel to protect from corrosion or mechanical injury.

These objects are obtained in one embodiment of the invention wherein a fourth mass is sprung to the vessel by gas springs disposed in both directions of its travel and each having a stiffness that is tuned to provide, with the fourth mass, a spring mass system having a natural frequency equal to the operating frequency of the engine. A gas spring pressure balancing system is provided to maintain the pressure of the gas springs such that the tune of the absorber and the engine are maintained.

DESCRIPTION OF THE DRAWINGS

The invention and its many attendant objects and advantages will become better understood upon reading the following detailed description of the preferred embodiments in conjunction with the following drawings, wherein.

DESCRIPTION OF THE PREFERRED EMBODIMENT

Figure 1:
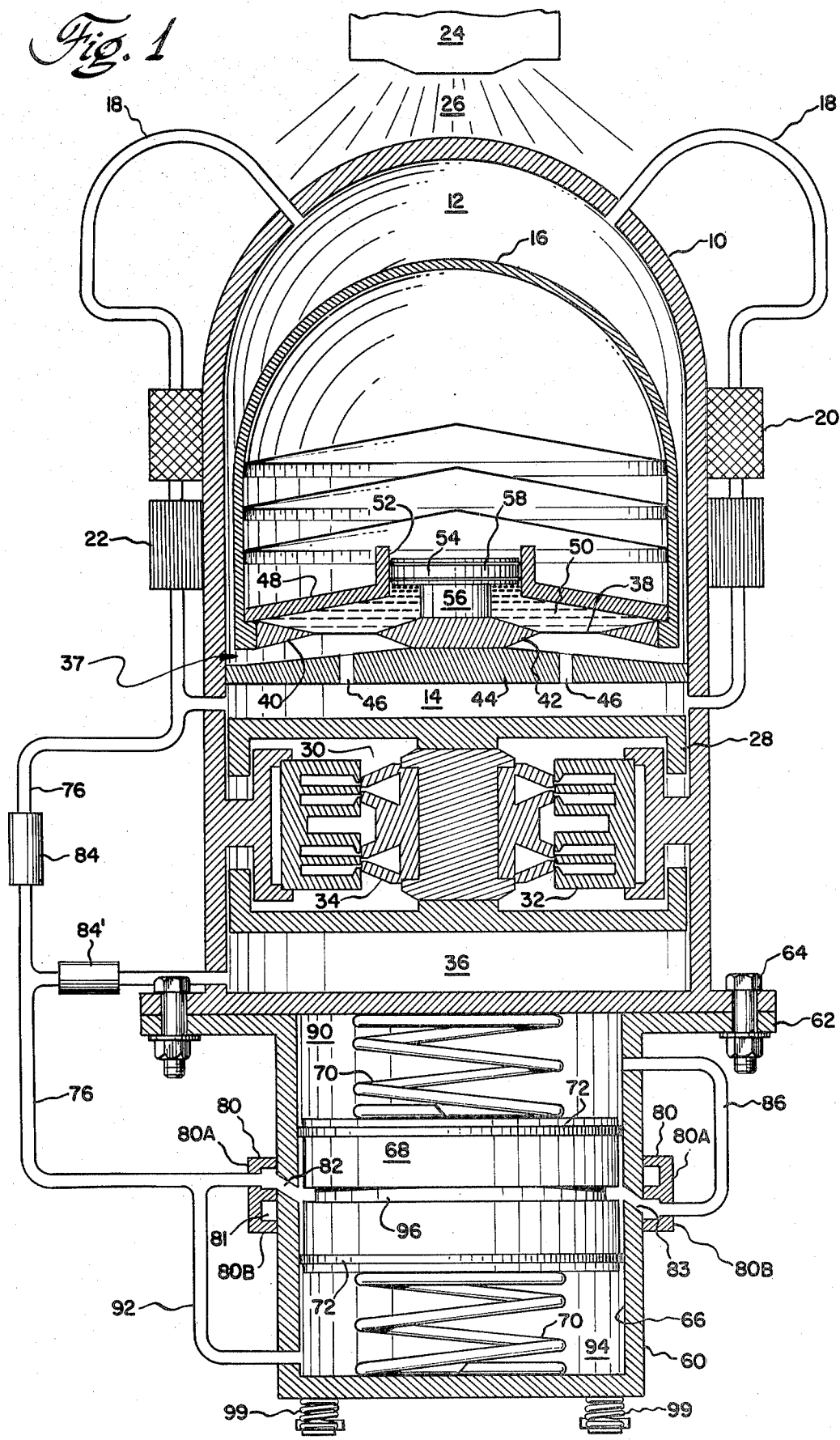
FIG. 1 is a schematic elevation of a free piston Stirling engine embodying a vibration absorber in accordance with this invention.

Referring now to the drawings wherein like reference characters designate identical or corresponding parts, and more particularly to FIG. 1 thereof, a free piston Stirling engine is shown having a sealed vessel 10 enclosing a working space including an expansion space 12 and a compression space 14, respectively, above and below a displacer 16 mounted for oscillation in the working space. The oscillation of the displacer 16 circulates working fluid contained within the working space from the expansion space 12 through a set of heater tubes 18, a regenerator 20, a cooler 22, and back into the compression space 14 below the displacer 16. The displacer 16 causes the gas to circulate back and forth through the heat exchangers between the compression and the expansion spaces and subjects it to a thermodynamic cycle in which heat energy, entering the heater tubes 18 from a combustor 24 burning fuel in a combustion space 26, is converted into mechanical energy of a power piston 28 which reciprocates under the influence of a pressure wave in the working space created by cyclically heating, expansion, cooling, and compression of the working gas.

The power piston 28 includes an axially extending plunger 30 which reciprocates opposite a stationary stator 32 attached to the interior wall of the vessel 10. The plunger is made up of a pair of axially spaced annular pole faces 34 and the stator 32 includes a corresponding pair of pole faces 35. The alternator is in the form disclosed in U.S. Pat. No. 3,891,874.

The volume in the vessel below the power piston 28 is sealed and constitutes a bounce space 36 or gas spring which returns the power piston 28 toward the top or engine end of the vessel after it has been displaced downwardly, as shown in FIG. 1, by the pressure wave in the working gas.

The displacer 16 is suspended in the working space by a suspension system 37. The suspension system includes a diaphram 38 connected at its outside peripheral edge 40 to the lower edge of the displacer shell 16 and connected at its center 42 to a partition 44 perforated by openings 46.

An oil backing system is provided for the diaphram 38, including a rigid plate 48 attached at its outer peripheral edge to the shell of the displacer 16. An oil cavity 50 is defined between the diaphram 38 and the rigid backing plate 48. A cylinder 52 is connected to or integrally formed with the backing plate 48 and receives a piston 54 connected rigidly to the partition 44 by a piston rod 56 so that the piston 54 remains stationary relative to the vessel 10. As the displacer 16 oscillates, the cylinder 52 moves up and down relative to the piston 54 to compensate for volumetric changes in the oil cavity 50 so that the diaphram 38 is not subjected to pressure induced stresses but sees only displacement induced stresses. This structure is more particularly described and explained in my copending U.S. Pat. No. 4,372,115 for "Oil Backed Stirling Engine Displacer Diaphram," filed concurrently herewith.

A separate housing 60 is attached to the vessel 10 by matching flanges 62 and bolts 64, or it may be integrally formed with the vessel 10. A cylinder 66 is enclosed within the housing 60 and contains a piston 68 which oscillates freely in the cylinder and is centered therein by weak centering springs 70. Top and bottom piston rings 72, or in their place labyrinth seals, prevent the leakage of gas passed the piston 68 from one side to the other.

A gas line 76 extends from the compression space 14 of the engine to the bounce space 36 and to the top section 80A of an annular manifold 80 connected to the axial midpoint of the cylinder 60. A set of midstroke ports 82 extend through the housing 60 and communicate between the cylinder 66 and the top section 80A of the manifold 80. A restriction 84 is disposed in the portion of the gas line 76 extending between the compression space 14 and the bounce space 36 so that only the mean pressure in the working space is communicated through the gas line 76 to the bounce space 36 and the manifold 80.

The annular manifold 80 includes a lower manifold section 80B which communicates with the cylinder 66 through a set of ports 83. A gas line 86 connects the lower manifold section 80B to the cylinder volume 90 above the piston 68 and another gas line 92 connects the upper manifold section 80A with the cylinder volume 94 below the piston 68. An annular groove 96 formed in the axial midposition of the piston 68 provides a communication channel for gas flow between the ports 82 and 83 at the midstroke position of the piston 68 but is misaligned from the ports 82 and 83 at all positions other than the midstroke position and therefore closes off gas flow communication between the ports 82 and 83 at these other positions.

In operation, the piston oscillates in phase position to the phasor addition of the piston and displacer inertia phasors so that the phasor addition of the inertia phasors of all the oscillating masses is virtually zero. The cancellation is not complete because there is some friction and hysteresis losses in the vibration absorber as the piston oscillates axially, and as the gas volumes 90 and 94 is alternately compressed and expands. This slight power loss by the absorber is made up by a slight phase lag from what the absorber mass motion would be without the absorber power loss. This causes a slight motion of the vessel 10 out of phase with the displacement of the piston 68 so that the gas spring volumes 90 and 94 are compressed and expanded slightly more than that which would be achieved by the movement of the piston 68 alone.

The midstroke porting arrangement provided by the manifold 80, the ports 82 and 83, and the piston groove 96 enables the gas spring volumes 90 and 94 to communicate through the gas lines 92 and 86 at the midstroke position of the piston 68. This ensures that the mean pressure in the gas spring volumes 90 and 94 will be equal so that the piston midstroke position will remain at the cylinder midstroke position. The gas line 76 communicating with the cylinder 60 through the restriction 84 ensures that the mean pressure in the gas spring volumes 90 and 94 will remain equal to the mean pressure in the engine working space.

Figure 2:
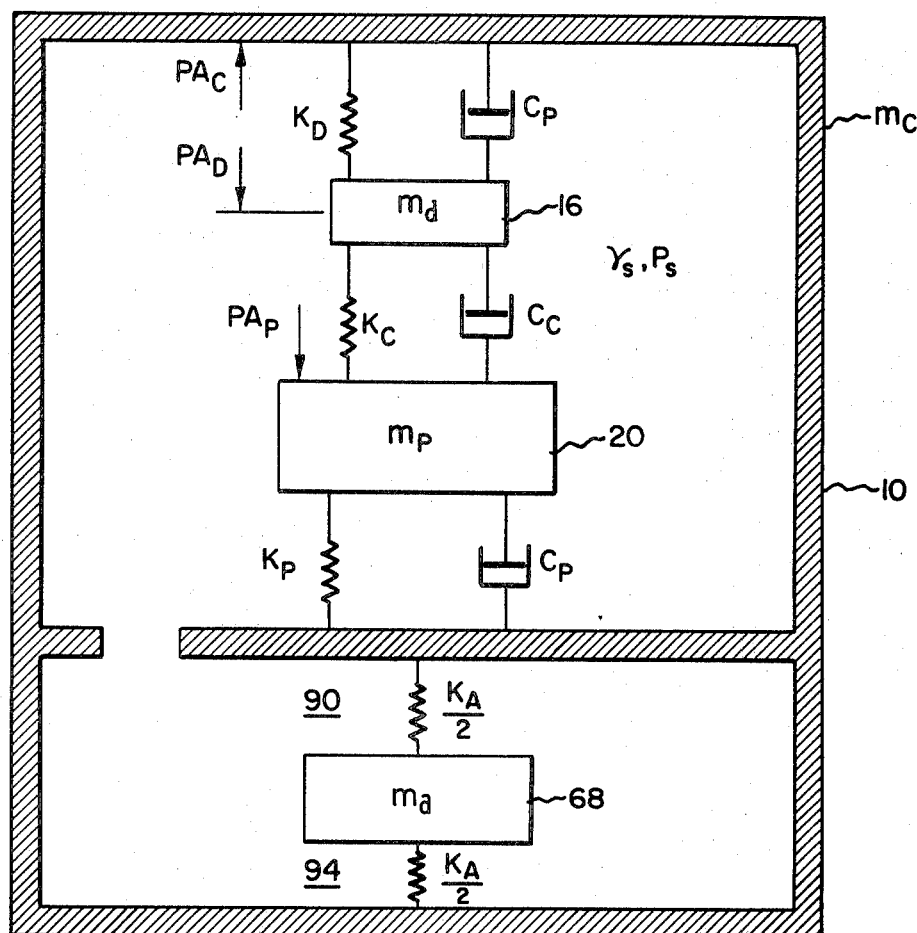
FIG. 2 is a schematic diagram of the invention.
Figure 3:
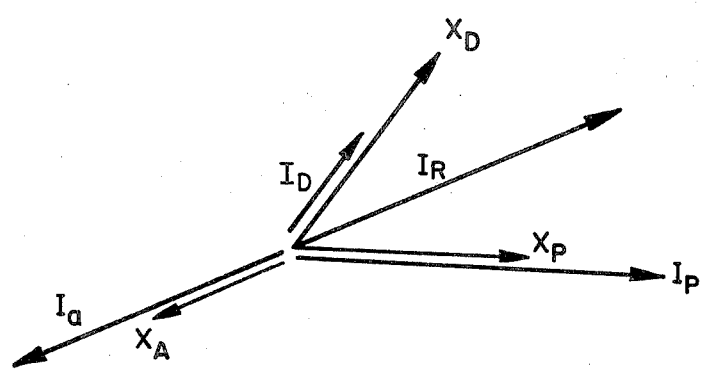
FIG. 3 is a phasor diagram showing the balancing of the inertia forces acting upon the vessel of the engine.

A schematic diagram of an engine and vibration absorber system is shown in FIG. 2 with the springs, masses, and dampers labeled, and a phasor diagram for the displacements and inertias of the elements in the system is shown in FIG. 3. The displacement phasor of the power piston 28 is indicated in FIG. 3 as phasor $X_P$ and its corresponding inertia phasor which is in phase with a displacement phasor is labeled $I_p$ where $I_p = M_p \omega^2 X_p$. The displacement phasor of the displacer 16 is labeled $X_d$ and leads the power piston phasor by some 60°–80°. The displacer inertia phasor $I_d$ is in phase with the displacer displacement phasor $X_d$ where $I_d = M_d \omega^2 X_d$. The inertia displacer phasor is smaller than the power piston inertia phasor because the displacer mass is considerably less than the power piston mass. The phase addition of the power piston inertia phasor and the displacer inertia phasor is shown as $I_r$; it is the inertia phasor that is transmitted to the sealed vessel 10 in the absence of a cancellation or absorption system.

The inertia phasor $I_r$ of the reciprocating engine components is substantially balanced by the inertia phasor $I_a$ of the reciprocating absorber piston 68. The inertia phasor $I_a$ lags the position of the inertia phasor $I_r$ by slightly more than 180° depending on the friction and hysteresis losses in the absorber system, as mentioned previously.

The cancellation or virtual cancellation of inertia by the absorber piston 68 under all operating conditions is achieved by self adjusting of the frequency and stroke of the absorber piston 68 as the conditions change. The frequency of the piston 68 is maintained by adjustment of the pressure in the gas spring volumes 90 and 94 when the mean pressure of the engine working space changes. The engine frequency is determined by the mean pressure of the working space. Thus, as the engine mean pressure increases, the frequency of the engine increases correspondly. Simultaneously, the mean pressure in the gas spring volumes 90 and 94 increase correspondly and the resonant frequency of the spring-mass system represented by the mass of the absorber piston 68 and the gas springs 90 and 94 increases equally. This frequency equality can be demonstrated by a derivation based on the inertia equality equation. This is represented by the equation $M_a \omega^2 X_a = M_p \omega^2 X_p + M_d \omega^2 X_d$ (this equation neglects the small movement of the vessel 10 which is necessary to impart sufficient work into the absorber spring mass system to overcome the damping effects of friction and hysteresis losses). The frequency of the absorber system is determined by the spring constant and the mass of the reciprocating member so that $\omega^2 = K_a / M_a$ where $K_a$ and $M_a$ are the spring constant and mass of the absorber, respectively, and where:

$$K_a = \frac{\gamma P_m A_a^2}{V_a}$$

in which expression:
  $\gamma$ = the ratio of constant volume to constant pressure specific heats of the working gas;
  $P_m$ = mean pressure;
  $A_a$ = absorber piston area;
  $V_a$ = absorber gas spring mean volume;
  $K_a$ = spring constant (of each gas spring).

Since the only thing that changes in the frequency expression is the value of $P_m$ and since the value of $P_m$ remains equal for the engine and for the absorber system under all conditions because of the mean pressure equalization system, therefore the resonant frequency of the two systems remain equal to each other, and the phase position of the absorber mass remains close to the 180° position relative to the inertia phasor $I_r$ of the reciprocating engine members.

The stroke of the absorber mass is also self adjusting to enable the magnitude of the absorber mass inertia phasor to match the magnitude of the resultant inertia phasor $I_r$ of the reciprocating parts of the engine. When some change occurs in the magnitude of the resultant inertia phasor of the moving parts of the engine, the difference will be transmitted to the vessel 10 for which purpose spring feet 99 are provided, and will be quickly eliminated by either increasing or decreasing the stored energy (i.e. stroke) of the absorber mass to provide an inertia phasor substantially equal and opposite to the resultant inertia phasor $I_p$ of the engine moving masses.

In operation assume the engine is running in a steady state condition under a steady electrical load on the alternator, and then the load on the alternator increases. The damping effect of the alternator load on the power piston tends to decrease the piston stroke and decrease the stroke and phase of the displacer, but this tendency is offset by the engine power control (not shown) which senses the incipient of initial power piston stroke change by direct stroke measurement, pressure change measurement, or sensing of the electrical load. The engine power control (one example of which is disclosed in U.S. Pat. No. 4,345,437 for "Stirling Engine Control System" filed by John J. Dineen on July 14, 1980) causes the engine working gas mean pressure to increase, which increases the capacity of the engine to convert input heat energy to mechanical work of the power piston.

The increase in the engine working gas mean pressure causes a nearly instantaneous corresponding increase in the mean pressure of the absorber gas springs. This increases the gas spring stiffness and increases the natural frequency of the absorber spring-mass system to match the engine frequency change, so that the absorber remains tuned to the engine under the operating conditions.

The vibration absorber of this invention thus provides the free piston Stirling engine with a self adjusting or self regulating mechanism for substantially cancelling or absorbing the inertia forces normally transmitted to the engine vessel. It eliminates the need for complicated, sophisticated, expensive, delicate, and injury prone mechanisms for suspending the engine vessel to prevent transmission of the vessel vibration to ground because the vessel itself is virtually stationary with the use of this invention. The only support mechanisms that the vessel requires are the usual simple and inexpensive spring feet on which compressors are normally mounted. The invention requires virtually no maintenance, has only one moving part and its life should exceed the life of the engine. It requires only simple machining techniques and inexpensive materials and therefore the cost of the system is low. It is itself quite in operation and, because it eliminates the vibration of the engine housing, the engine itself runs quieter with the use of this invention. It uses only miniscule amounts of energy and, in the unlikely event that service is ever required, can be serviced easily.

Obviously, numerous modifications and variations of the disclosed embodiment are possible will occur to those skilled in the art in light of this disclosure.

Therefore, it is expressly to be understood that these modifications and variations, and the equivalence thereof, may be practiced while remaining within the spirit and scope of the invention which is set forth in the following claims, wherein I claim:

1. A dynamic vibration absorber for a free piston Stirling engine having a vessel of mass $M_c$ defining therein a cylinder in which oscillates a displacer of mass $M_d$ for displacing working gas in a working space through a heater, a regenerator, and a cooler, and generating thereby a pressure wave in the working gas; and a power piston of mass $M_p$ which oscillates under the influence of the pressure wave to produce output power, wherein the absorber comprises:
   a fourth mass $M_a$ sprung to said vessel by gas springs having a combined stiffness $K_a$ that is tuned to provide with said mass $M_a$ an absorber spring-mass system having a natural frequency equal to the operating frequency of the engine, which natural frequency varies with the engine working gas mean pressure to maintain said tune of the absorber and the engine.

2. The vibration absorber defined in claim 1, wherein said fourth mass oscillates in approximate phase opposition to the phasor addition of said displacer and said power piston motion.

3. The vibration absorber defined in claim 1, wherein said fourth mass is an absorber piston oscillating in a cylinder connected to said vessel, and further comprising means for pressurizing said gas springs by the engine working gas to the same mean pressure as said engine working space.

4. The vibration absorber defined in claim 3, wherein said gas spring pressurizing means includes:
   a gas line connected between a source of engine working gas pressurized to said mean pressure and to a first midstroke port in said cylinder; a first gas flow line connected between one of said gas springs and said first gas port; a second gas flow line connected between the other of said gas springs and a second midstroke port in said cylinder; and a gas flow channel in said absorber piston connecting said midstroke ports at the absorber piston midstroke position to equalize the two gas spring pressures and said source of engine working gas.

5. The vibration absorber defined in claim 1, wherein: said absorber spring-mass system having a natural frequency equal to $$\sqrt{\frac{K_a}{M_a}} \text{ where } K_a = \frac{\gamma P_m A_a^2}{V_a} \text{ and}$$

$\gamma$ = the ratio of constant volume to constant pressure specific heats of the working gas;
$A_a$ = absorber piston area;
$V_a$ = absorber gas spring mean volume;
$P_m$ = engine working gas mean pressure;
wherein the values of $\gamma$, $A_a$, and $V_a$ are substantially constant, so the value of $K_a$ varies as a linear function of the value of $P_m$;
said engine frequency likewise being a function of engine pressure;
whereby said absorber natural frequency, when tuned to said frequency, will remain tuned thereto regardless of changes in engine working gas mean pressure.

6. A vibration absorber for a free piston Stirling engine having a displacer and power piston of masses $M_d$ and $M_p$, respectively, oscillating in a vessel defining therein an engine working space in which said displacer oscillates to displace working gas, contained in said working space at a mean charge pressure, through a heater, a regenerator, and a cooler to generate a pressure wave in said working gas that drives said power piston to produce an output power stroke; and vibration absorber comprising:

a housing connected to said vessel;
a cylinder formed within said housing;
an absorber piston slidably received within said cylinders, said absorber piston having two end faces;
a first gas spring defined between one end of said cylinder and the adjacent one of said absorber piston end faces;
a second gas spring defined between the other end of said cylinder and the other absorber piston end face;
gas communication means connecting said working space and said gas springs for establishing and maintaining the equality of the mean gas pressure in said working space and said gas springs.

7. The vibration absorber as defined in claim 6, wherein said gas communication means includes a gas line connected between said working space and said cylinder and having a restriction therein which transmits the long term mean pressure variations and filters out the high frequency pressure fluctuations of the working gas pressure wave.

8. The vibration absorber defined in claim 6, wherein said gas communication means includes;

a gas line connecting said cylinder to a gas pressure source maintained at the mean pressure of said working gas;
a first gas flow passage connecting said first gas spring volume to a first midstroke port;
a second gas flow passage connecting said second gas spring volume with a second midstroke port;
a midstroke passage for connecting said first and second midstroke ports at the midstroke postion of said absorber piston;
whereby said first and second gas spring volume pressures are equalized at the midstroke position of said absorber piston.

9. The vibration absorber defined in claim 8, wherein said midstroke passage includes a channel formed in said absorber piston and aligned with said first and second midstroke ports at said midstroke position.

10. The vibration absorber defined in claim 6, wherein the inertia phasor of said absorber piston is maintained in approximate phase opposition to the phasor addition of the displacer and power piston inertia phasors by the change in stiffness of said first and second gas springs.

* * * * *